United States Patent Office 3,292,998
Patented Dec. 20, 1966

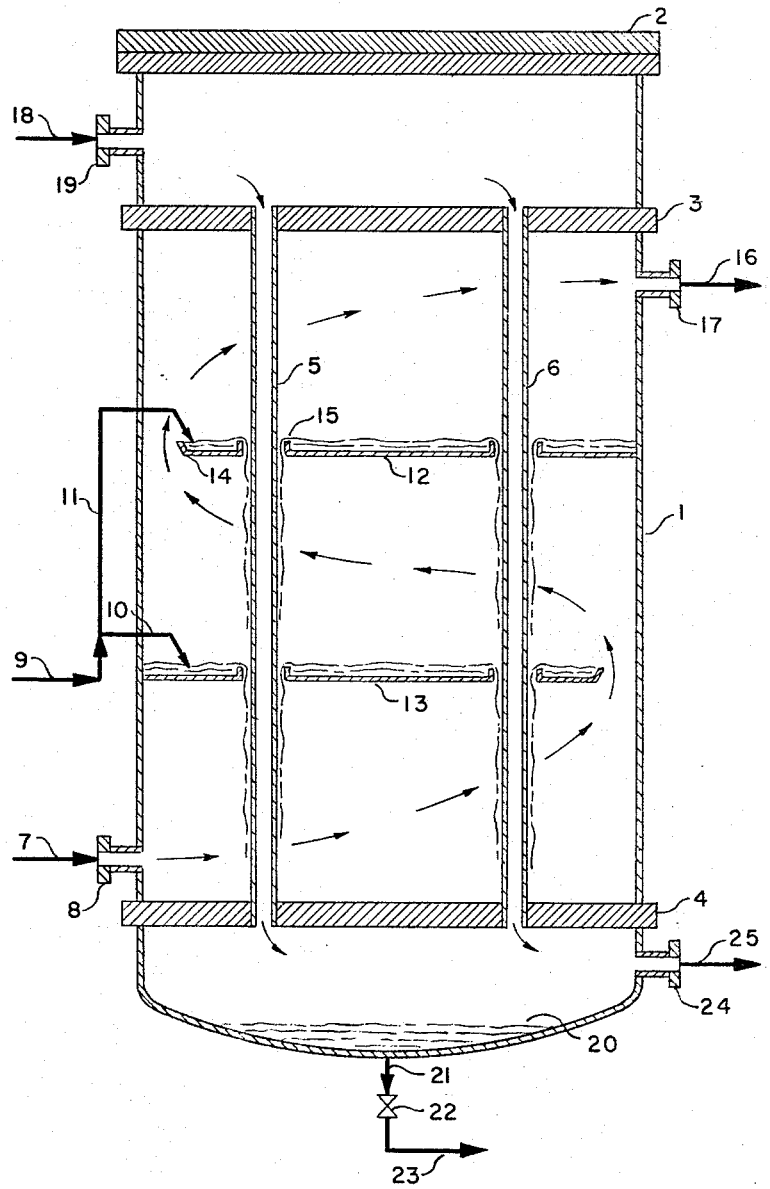

3,292,998
METHOD OF PRODUCING HYDROGEN FROM A CARBON MONOXIDE-CONTAINING GAS STREAM AND HEAT RECOVERY
George Russell James, Armonk, N.Y., assignor to Chemical Construction Corporation, New York, N.Y., a corporation of Delaware
Original application Jan. 11, 1960, Ser. No. 1,571. Divided and this application Mar. 22, 1963, Ser. No. 268,212
2 Claims. (Cl. 23—213)

This invention relates to processes in which heat in the form of latent heat of vaporization is exchanged between gas streams, with the heated gas stream receiving vaporized liquid while the cooled stream gives up heat mainly through the liquefying of condensable vapor, and is a division of application Ser. No. 1,571 filed Jan. 11, 1960, and now abandoned. A process and apparatus for performing the process has been devised, which provides improved process efficiency and more economical transfer of heat. More sepcifically, the process relates to the preparation of gas for the catalytic reaction of carbon monoxide with water vapor to produce hydrogen. The process of the present invention provides improved heat economy and steam savings in connection with the required addition of water vapor to the process gas stream.

Numerous industrial processes require the addition of a vapor component to a gas stream prior to reaction at elevated temperature. Where the vapor component is generated from a liquid source, thermal requirements in producing the vapor are usually an important consideration in the overall efficiency of the process. Where the final gas stream after reaction contains a significant proportion of unreacted vapor, separation of this vapor is usually accomplished by cooling and low temperature condensation, and since the latent heat of vaporization is only available at a relatively low temperature, this heat is usually wasted. A typical process of this nature is the production of hydrogen from gas streams containing carbon monoxide, by catalytic reaction of the carbon monoxide with water vapor at an elevated temperature. A detailed discussion of the standard aspects of this process appears in an article published in "Chemical and Metallurgical Engineering" v. 43, #3 (March 1936), p. 122–126.

In this process as usually practiced, the incoming cold gas stream is contacted with a stream of hot water flowing countercurrently in a packed tower. As a result the gas stream is warmed and in addition the required amount of water vapor is added to the gas stream by evaporation of some of the hot liquid water. The humidified and warmed gas stream is then further heated in conventional heat exchangers, and is passed through one or more stages of catalytic reaction. The resulting hot product gas stream is then cooled and a portion of the residual unreacted water vapor contained therein is removed, by passing the gas stream through a second packed tower countercurrent to a stream of cool water. This cool water stream is preferably obtained as the residual water stream from the first tower, and the resulting hot water stream obtained from the second tower is recycled to the first tower. Thus a circulating liquid water circuit is maintained between the two towers, at two temperature levels. It is evident that this conventional system requires considerable expensive equipment for the alternate humidification and dehumidification, namely, two packed towers and associated pumps and piping.

Various other modified systems of heat recovery are described in U.S. Patents 2,829,113, 2,465,235 and 1,614,072. In these patents the sensible heat available in the reacted gas stream is partially recovered at a relatively higher temperature level by heat exchange with liquid water. However, the low temperature level heat, principally latent heat of vaporization derived by condensation of excess water vapor, is essentially wasted.

Numerous other industrial processes involve condensation of vapor from a gas stream by cooling, and in many instances the teaching of the present invention is applicable as a means of effecting considerable savings in net heat requirements, whenever vapor is to be added to a second gas stream. Thus, for example, the gasification of hydrocarbon oils involving high temperature generation and quench cooling, produces a hot wet gas which is saturated with water vapor and contains entrained solid particles and also possibly contains tars and resins. The usual procedure is to cool and scrub this gas stream using water. This step also condenses considerable water vapor from the gas stream. The resulting stream of hot dirty water is discarded, and consequently considerable heat is lost, especially latent heat of vaporization. The gas stream is then further cooled and passed to sulfur removal. Subsequent to sulfur removal the gas stream is reheated and steam is added prior to further process treatment. Obviously this sequence of process steps involves considerable loss of heat.

In the present invention an apparatus and procedure is provided which produces a simultaneous cooling of a gas stream and condensation therefrom of condensable vapor, while in heat exchange with a second gas stream which is heated and to which a second vapor is added by introducing liquid to be evaporated on the heat exchange surface. The apparatus of the present invention is readily distinguished from known shell and tube heat exchangers, since the shell side baffles are employed to disperse liquid being evaporated onto the outer surface of the tubes.

It is an object of the present invention to effect latent heat exchange between gas streams.

Another object is to recover in a more efficient manner the latent heat of vaporization available from condensable vapors in gas streams.

A further object is to provide more effective apparatus for accomplishing latent heat exchange between gas streams.

Still another object is to provide an improved process for the catalytic production of hydrogen from carbon monoxide and water vapor, with improved thermal efficiency and conversion of available heat.

An additional object is to more efficiently add vapor to a gas stream by vaporizing liquid using latent heat of vaporization of condensing vapor from another gas stream.

Another object is to provide a process and apparatus suitable for heat recovery from gas streams by vapor condensation which permits such recovery when the gas stream contains entained solid particles.

These and other objects of the present invention will be evident from the description which follows.

Referring to the figure, vessel 1 is a container in which the exchange of latent heat takes place. If one or both gas streams are at high pressure, vessel 1 may be provided with a high pressure closure such as cover 2. Vessel 1 is divided into sections by partitions 3 and 4, which are provided with openings which are connected by ducts 5 and 6. Although only two ducts are shown in the figure, this is merely for illustrative purposes. It should be borne in mind that it is within the scope of this invention to incorporate within vessel 1 any suitable number of ducts to provide optimum performance. The colder gas stream 7 which is to be warmed and into which liquid is to be vaporized, is admitted via opening 8 into vessel 1 in the section between partitions 3 and 4 and external to ducts 5 and 6. The liquid stream 9 to be vaporized into stream 7 is admitted via inlet means 10 and 11 onto gas baffles 12 and 13. These gas baffles extend part way across the central section of vessel 1 and external to ducts 5 and 6, in such a manner as to direct the gas stream 7 in a flow path as shown by the arrows, substantially transverse to ducts 5 and 6. The gas baffles have the additional function of distributing liquid admitted via 10 and 11 onto the outer surface of ducts 5 and 6. Two baffles are shown in the figure, but one or more than two could be used depending on the size of the vessel 1 and the volume of gas to be humidified per unit of time. Retention and horizontal flow of liquid is maintained by lips such as 14, over which any excess of liquid may flow to the next lower baffle. The main flow of liquid, however, is across the gas baffles and over weirs such as 15 or other distributing means which serve to evenly distribute the liquid onto the outer surface of ducts 5 and 6. In some cases the weirs may be omitted, as for example, when it is desired to essentially flood the wetted surface. In these cases a considerable excess of liquid would be admitted onto baffles 12 and 13, greater than could be evaporated. Residual liquid would then accumulate above partition 4 and would be removed or recycled by suitable means.

The liquid film flowing down the outer surface of ducts 5 and 6 receives heat from the stream inside the ducts, and is vaporized. The hot vapors join the gas stream 7, which is also heated. A final exit gas stream 16 which is warm and contains the added vapor component is removed via opening 17.

The heating effect is produced by obtaining heat, principally latent heat of vaporization, from a hot vapor-laden gas stream 18 which is admitted via opening 19 into vessel 1 in the upper section thereof between cover 2 and partition 3. The gas stream 18 then flows downwards inside ducts 5 and 6, and is cooled with resulting condensation of liquid derived from the vapor in the gas stream. Depending on flow velocity considerations, some liquid may form in the ducts within the gas stream. However, the principal amount of condensation will occur on the inner walls of ducts 5 and 6. Thus condensed liquid will flow down the inside walls of ducts 5 and 6. The simultaneous flow of liquid on both heat transfer surfaces, which consist of the inner and outer surfaces of ducts 5 and 6, is an important aspect of the present invention to be discussed infra.

The cooled gas stream is removed from the bottom section of vessel 1 via openings 24 as stream 25. The condensed liquid collects in the bottom of vessel 1 as pool 20, and is removed as required via line 21, valve 22 and line 23. In some cases, provided that no impurities are present, line 23 may join line 9 thus adding the hot condensate to the shell side of vessel 1 for re-vaporization.

This invention offers numerous advantages as compared with practice in the prior art, particularly in the case of carbon monoxide reaction with water vapor to produce hydrogen. The apparatus of the present invention is much simpler and more economical, since a single unit is provided rather than two packed towers and associated pumps and piping. Of particular importance is the fact that much higher heat recovery is achieved, since closer temperature approaches are achieved with higher evaporation on the liquid vaporizing side of the unit. It is believed that a major factor in producing the improved heat economy is the simultaneous flow of liquid on the inner and outer surfaces of the ducts. Apparently the flowing liquid films effectively reduce gas film resistance to heat transfer to a negligible factor in the overall situation. It will be readily understood by those skilled in the art that gas film resistance to heat transfer is a major consideration in heat exchange processes. An additional advantage of the present invention is the fact that the hot gas is passed inside the ducts. Consequently, any deposit of solids or sludge is readily eliminated from the unit. This factor is quite important in such situations as the cooling of gas streams derived from hydrocarbon gasification, as discussed supra.

A preferred embodiment of the present invention involves application of the concept to the art of catalytic carbon monoxide reaction with water vapor, whereby hydrogen is produced. An example of such a situation will now be described.

*Example 1*

A typical example of a gas stream containing carbon monoxide which is processed by the present invention is the off-gas derived from acetylene synthesis, after removal of acetylene and other values. The residual gas stream is rich in carbon monoxide and is recovered as a cool dry gas, typically at 90° F. and 100 p.s.i.g. This gas stream was warmed to 280° F. and saturated with water vapor using the apparatus of the present invention, and was then passed through a gas to gas preheater prior to catalytic hydrogen synthesis. After hydrogen synthesis, the resulting gas stream, rich in hydrogen and containing considerable unreacted water vapor was then passed in heat exchange through the gas to gas preheater and was recovered as a hot wet gas at 500° F. and 90 p.s.i.g. This hot wet gas stream may be recovered in some instances at temperatures ranging from about 280° F. to about 500° F. This hot gas stream was in turn cooled by passing through the ducts of the apparatus of the present invention, and a major proportion of water vapor therein was condensed to liquid water. The final cooled converted gas stream was recovered at 235° F. and 88 p.s.i.g. and passed to further treatment including carbon dioxide removal. In this particular process, operating temperatures fluctuated over a range of about 30° F., particularly the cool off-gas which varied in original temperature from 70° F. to 100° F., depending on prior processing temperature conditions. Corresponding variations thus occurred, but to a lesser degree, in the other gas temperatures. Thus the final cooled converted gas was recovered at temperatures ranging from about 220° F. to 245° F.

The importance of recovery of latent heat of vaporization by the teaching of the present invention is shown by facts relative to the aforementioned example. It was determined that B.t.u.'s of heat recovered in cooling the hot gas from 500° F. to 270° F., a temperature range of 230° over which only sensible heat was removed without vapor condensation, was equalled by the heat recovered over the next 9° of cooling from 270° F. to 261° F., a range in which vapor condensation took place. Actually the great bulk of heat recovery was achieved over the lower range of the cooling from 270° to 235° F., during which vapor condensation was taking place. Thus the process of the above example will result in recovery of a relatively large quantity of heat with any lower input hot gas temperature above 280° F., for the aforementioned reasons. Hence it is possible by the teaching of the present invention to use the sensible heat in the output gas, which is available at a high temperature level, for various other purposes.

Other similar carbon monoxide-containing gas streams which may be processed in this manner include coke oven gas, petroleum refinery off-gas, and the conventional water gas derived from coal. Operable ranges of pressure and temperature will suitably be inlet pressure range of between 15 p.s.i.g. to 500 p.s.i.g. and hot gas inlet temperature of about 250° F. to 600° F. with corresponding cold gas outlet temperature at a suitable lower value preferably between about 200° F. to 450° F., so as to achieve acceptable heat transfer and liquid vaporization rates within the unit.

Other applications of the present invention are shown in the following examples.

Example II

The utility of the present invention in hydrocarbon gasification processes was shown in an application involving the hot gas, saturated with water vapor, which is produced by the gas generator followed by the water quench unit. This gas stream, also containing solid carbon particles, was cooled in a heat recovery unit of the present invention. The resulting stream of dirty condensate water was readily removed without plugging the apparatus. The hot gas was admitted to the unit at 395° F. and 400 p.s.i.g., and removed at 350° F. and passed to sulfur removal.

The gas stream was received after sulfur removal as a relatively dry gas with a temperature of 240° F. This gas was then heated and humidified in the apparatus, and passed to further treatment at 380° F. and 385 p.s.i.g. Thus by the method and apparatus of the present invention, the sulfur-free gas stream was heated and humidified at negligible cost, since in the prior art as discussed supra the recovery of heat from the hot dirty generator gas has usually not been completely achieved, with required cooling being accomplished by water scrub with discharge of the resulting dirty warm water to waste.

Example III

The present invention was applied to a conventional hydrogen process in which essentially all carbon monoxide in a gas stream is converted to hydrogen. The conventional hydrocarbon reform steps were employed, namely, primary and secondary reform followed by cooling in a waste heat boiler, to react methane with steam and oxygen and produce a process gas stream comprising carbon monoxide, water vapor and hydrogen at 800° F. The gas stream was passed through the first stage of carbon monoxide conversion to produce more hydrogen. The exit gas stream at 850° F. was then partially cooled to 450° F. in a gas to gas preheater, and further cooled to 240° F. in the reboiler of a regenerator which was employed in the carbon dioxide absorption process. The gas stream, now saturated with water vapor, was passed through an apparatus unit of the present invention and cooled from 240° F. to 200° F. at about 70 p.s.i.g. Although the temperature drop was comparatively small, a large quantity of heat was removed due to condensation of water vapor from the gas stream.

The gas stream was then cooled further in a conventional heat exchanger, and finally passed to the carbon dioxide absorber where carbon dioxide was absorbed in a scrubbing solution. The resulting cool gas stream, consisting principally of hydrogen together with a small quantity of carbon monoxide, was then warmed from 100° F. to 232° F. and humidified in the aforementioned apparatus unit of the present invention. The hot saturated gas was finally passed to the gas to gas preheater prior to the second stage of carbon monoxide conversion.

The present invention should not be restricted to the processing described supra, since numerous variations within the scope of the present invention will occur to those skilled in the art. Thus for example, in some cases the hot condensate water recovered from the gas being cooled and withdrawn at the bottom of the unit will be quite clean, and all or a portion of this hot water could be utilized to furnish the liquid stream being fed to the gas baffles for evaporation on the cold gas side of the unit. In other instances such as in heat recovery from dirty gas produced by hydrocarbon gasification, the condensate stream which is produced by cooling the gas stream will be contaminated, and at best could be utilized in a heat exchanger to indirectly warm the incoming liquid being fed to the gas baffles.

It should be noted that the apparatus may be operated with the hot gases in and out at the bottom rather than the top. This arrangement would result in recovery of a hotter condensate from the hot gas stream being cooled. However, a limiting factor in such a procedure is gas flow velocity, since an excessively high gas velocity could result in carryover of condensed liquid up through the tubes.

Finally, the present invention is applicable to cases where transfer of latent heat is to occur between two different liquids which must be maintained separate from each other.

What I claim is:

1. In the process of catalytic reaction of carbon monoxide in a feed gas stream with water vapor at a temperature in the range of about 800° F. to 850° F. to produce a hot product gas stream principally containing hydrogen, carbon dioxide and excess unreacted water vapor, the method of heat recovery by transfer of latent heat derived from water vapor condensation which comprises passing said feed gas stream at a pressure of between about 15 p.s.i.g. to 500 p.s.i.g. in contact with a film of liquid water flowing downwards on the outer surface of a vertically oriented duct, said feed gas stream flowing generally upwards countercurrent to said liquid water film, and vaporizing said liquid water film by concurrently passing said hot product gas stream precooled to a temperature in the range of about 250° F. to 600° F. downwards through said duct, whereby said feed gas stream is heated to a temperature of between about 200° F. to 450° F. and water vapor is incorporated therein catalytically reacting carbon monoxide in said feed gas stream with water vapor, partially cooling the resulting hot product gas stream to a temperature in the range of about 250° F. to 600° F., and vaporizing said liquid water film as aforesaid by passing the partially cooled product gas stream downwards through said duct, and thereby further cooling said partially cooled product gas stream to a lower temperature in the range from about 200° F. to less than 270° F. and condensing water vapor from said product gas stream, whereby the latent heat of condensation from said condensing water vapor is transferred through said duct to said liquid water film being vaporized into said feed gas stream.

2. In the process of catalytically reacting the carbon monoxide content of a residual off-gas stream derived from acetylene manufacture with water vapor at elevated temperature to produce a hot product gas stream principally containing hydrogen, carbon dioxide and excess unreacted water vapor, the method of heat recovery by transfer of latent heat derived from water vapor condensation which comprises contacting said residual off-gas stream at a pressure in the range of about 15 p.s.i.g. to 500 p.s.i.g. and initial temperature of between about 70° F. to 100° F. with a film of liquid water flowing downwards on the outer surface of a vertically oriented duct, said residual off-gas stream flowing generally upwards countercurrent to said liquid water film, and vaporizing said liquid water film by concurrently passing said hot product gas stream precooled to a temperature in the range of about 280° F. to 500° F. downwards through said duct, whereby said residual off-gas stream is heated and water vapor is incorporated therein, catalytically reacting carbon monoxide in said residual off-gas stream with water vapor, partially cooling the resulting hot product gas stream to a temperature in the range of about 280° F. to 500° F., and vaporizing said liquid water film as aforesaid by passing the partially cooled product gas stream downwards through said duct, and thereby further cooling said partially cooled product gas stream to a lower temperature of between about 220° F. to 245° F. and condensing water vapor from said product gas stream, and transferring the latent heat of condensation of said condensing water vapor through said duct to said liquid water film being vaporized into said residual off-gas stream.

(References on following page)

References Cited by the Examiner

UNITED STATES PATENTS

| | | | |
|---|---|---|---|
| 1,703,747 | 2/1929 | Patart | 23—213 |
| 2,310,121 | 2/1943 | Scherer | 261—153 X |
| 2,545,028 | 3/1951 | Haldeman | 261—153 |
| 2,934,407 | 4/1960 | Simonek et al. | 23—213 |
| 2,944,966 | 7/1960 | Eickmeyer | 165—118 X |

FOREIGN PATENTS

| | | |
|---|---|---|
| 324,158 | 1/1930 | Great Britain. |
| 459,644 | 9/1950 | Italy. |

OSCAR R. VERTIZ, *Primary Examiner.*

MAURICE A. BRINDISI, *Examiner.*

B. LEVENSON, *Assistant Examiner.*